United States Patent
Mueller et al.

(10) Patent No.: US 6,327,113 B1
(45) Date of Patent: Dec. 4, 2001

(54) ROTATABLE CARTRIDGE ENGAGING ASSEMBLY

(75) Inventors: Robert L. Mueller, Windsor; David P. Jones, Bellvue; Robert W. Luffel, Greeley, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/456,464

(22) Filed: Dec. 8, 1999

(51) Int. Cl.$^7$ .................................................. G11B 15/68
(52) U.S. Cl. .......................................... 360/92; 369/30.45
(58) Field of Search ................................ 369/36, 38, 178, 369/191–194, 30.43, 30.45, 30.57, 36.01, 178.01; 360/92

(56) References Cited

U.S. PATENT DOCUMENTS

| | | | |
|---|---|---|---|
| 4,675,856 | * 6/1987 | Rudy et al. | 369/36 |
| 4,685,095 | * 8/1987 | Rudy et al. | 369/36 |
| 4,787,074 | * 11/1988 | Deck et al. | 369/36 |
| 4,815,055 | * 3/1989 | Fago, Jr. | 369/36 |
| 4,815,056 | * 3/1989 | Toi et al. | 369/36 |
| 5,010,536 | 4/1991 | Wanger et al. | 369/36 |
| 5,036,503 | * 7/1991 | Tomita | 369/36 |

(List continued on next page.)

FOREIGN PATENT DOCUMENTS

| | | |
|---|---|---|
| 0 281 006 A2 | * 9/1988 | (EP) . |
| 0351221A | 7/1989 | (EP) . |
| 0905688A | 9/1998 | (EP) . |
| 61-158063 | * 7/1986 | (JP) . |
| 62-219364 | * 9/1987 | (JP) . |
| 3-134861 | * 6/1991 | (JP) . |
| 7-272382 | * 10/1995 | (JP) . |

OTHER PUBLICATIONS

U.S. Patent Application Serial No. 09/292,781 filed Apr. 13, 1999 for Low Power Illuminator of Richard L. Gardner, Jr., et al. (Attorney Docket No. 10982311–1).

U.S. Patent Application Serial No. 09/237,516 filed Jan. 26, 1999 for Improved Thumb Referencing and Drive System of Coffin, et al. (Attorney Docket No. 10981652–1).

U.S. Patent Application Serial No. 09/045,134 filed Mar. 20, 1998 for Multi–Plane Translating Cartridge Handling System of Schmidtke, et al. (Attorney Docket No. 10971539–1).

U.S. Patent Application Serial No. 09/045,558 filed Mar. 20, 1998 for Cartridge Engaging Assembly with Rack Thumb Actuator System of Coffin, et al. (Attorney Docket No. 10971538–1).

*Primary Examiner*—William Klimowicz

(57) ABSTRACT

A cartridge engaging assembly for translating a cartridge is disclosed. The cartridge engaging assembly may include a linearly translatable cartridge engaging device adapted to engage a cartridge, and a first drive assembly operably connected to the cartridge engaging device which is adapted to linearly translate the cartridge engaging device in a lateral direction. A second drive assembly is operably connected to the cartridge engaging device and is adapted to linearly translate the cartridge engaging device in a longitudinal direction. A third drive assembly is operably connected to the cartridge engaging device and is adapted to rotate the cartridge engaging device around an axis. In one embodiment, the cartridge engaging assembly also includes a flip latch assembly, and the second drive assembly and the third drive assembly use the same motor. One or two tracking devices such as a bar code reader may also be included. A cartridge handling system utilizing the cartridge engaging assembly of the present invention is also disclosed, as is a method for rotating a cartridge engaging device of the cartridge engaging assembly of the present invention.

15 Claims, 9 Drawing Sheets

U.S. PATENT DOCUMENTS

| | | | |
|---|---|---|---|
| 5,043,962 | * | 8/1991 | Wanger et al. .......................... 369/36 |
| 5,133,632 | * | 7/1992 | Aramaki et al. ...................... 414/283 |
| 5,150,341 | * | 9/1992 | Shibayama ............................. 369/36 |
| 5,293,284 | | 3/1994 | Sato et al. .............................. 360/92 |
| 5,602,821 | * | 2/1997 | McPherson et al. ................. 369/178 |
| 5,638,349 | * | 6/1997 | Rugg et al. ............................. 369/36 |
| 5,680,375 | * | 10/1997 | Christie, Jr. et al. ................... 369/30 |
| 5,682,096 | * | 10/1997 | Christie, Jr. et al. ............. 324/207.2 |
| 5,742,570 | | 4/1998 | Taki et al. ............................... 369/36 |
| 6,041,026 | * | 3/2000 | Hammar et al. ....................... 369/36 |
| 6,155,766 | * | 12/2000 | Ostwald et al. ..................... 414/279 |

\* cited by examiner

ROTATABLE CARTRIDGE ENGAGING ASSEMBLY

FIELD OF THE INVENTION

The present invention relates generally to a cartridge handling system for storing and translating data cartridges, and more specifically to a cartridge engaging assembly which is rotatable in order to access more than one plane of cartridge locations.

BACKGROUND OF THE INVENTION

Data storage in the computer industry is accomplished in a number of ways. For example, data may be stored on tape, compact disk, "floppy" or "hard" disk, and the like. Oftentimes, data storage media which is transferrable from one location to another is housed within a parallelepiped-shaped cartridge. However, it is to be understood that the term "cartridge" as used herein includes other types of storage media and should not be construed to limit the present invention to be utilized only with data cartridges.

Data storage systems are used to store data storage media devices such as data cartridges at known locations and to retrieve desired cartridges so that data may be written to or read from the cartridges. Such data storage and handling systems are often referred to as "juke box" data storage systems, particularly if they can accommodate a large number of individual data cartridges.

A data storage handling system may include a cartridge engaging assembly or "picker" which is adapted to retrieve a data cartridge and transfer the cartridge from one location to another, such as from a cartridge storage array to a read/write drive. The drive may then be used to read data from or write data to the cartridge. Once the read/write operation is complete, the cartridge engaging assembly may withdraw the data cartridge from the drive and return it to the appropriate location within the cartridge storage array. Cartridge engaging assemblies are described in U.S. Pat. No. 5,010,536 for CARTRIDGE HANDLING SYSTEM, U.S. Pat. No. 6,160,786 for CARTRIDGE ENGAGING ASSEMBLY WITH RACK DRIVE THUMB ACTUATOR SYSTEM and U.S. Pat. No. 6,157,513 for IMPROVED THUMB REFERENCING AND DRIVE SYSTEM, which are each hereby specifically incorporated for all that is contained therein.

There are some cartridge engaging assemblies which can access only a single plane of cartridge locations. Such a cartridge engaging assembly may be connected to a drive assembly which translates the assembly in a linear direction along a row of cartridge locations. There are also several different types of cartridge engaging assemblies which are capable of accessing more than one plane of cartridge locations.

For example, a "pass-through" cartridge engaging assembly is capable of gripping cartridges which are aligned opposite one another along two parallel planes. Typically, friction belts or rollers are used to grip and translate the cartridges within the cartridge engaging assembly. The two-plane access results in a more dense product architecture. However, there are a number of problems associated with "pass-through" cartridge engaging assemblies. The design of the assembly necessarily becomes significantly more complex and is subject to greater unreliability due to this complexity. The number of components in such an assembly is typically more than twice the number of components in a single-plane cartridge engaging assembly. Furthermore, friction gripping of the cartridges relies on developing a consistently high enough normal force and fiction coefficient in order to extract, translate, and insert media from and into storage locations and read/write drives. In addition, since "pass-through" cartridge engaging assemblies are not adapted to rotate the cartridges, cartridges will be facing front-forward in one plane and front-rearward in the other plane. Thus, cartridge storage locations must either be adapted to accept cartridges in both orientations (front-rearward and front-forward), or two different types of cartridge storage locations must be included in a system with a pass-through cartridge engaging assembly. Furthermore, in systems in which the cartridges are scanned by some type of tracking device such as a bar code reader, the system must be provided with two tracking devices (one facing each plane of cartridges), and cartridges must have bar code labels on both the front and the back thereof. Alternately, a tracking device may be located within the cartridge engaging assembly, whereby a cartridge with a bar code label on only one side thereof (usually the front) must be loaded into the cartridge engaging assembly in order to read the label. This results in a significant time delay in all but the smallest of systems. A tracking system for a cartridge engaging assembly is shown and described in U.S. patent application Ser. No. 09/292,781, now abandoned, for LOW POWER ILLUMINATOR, which is hereby specifically incorporated for all that is contained therein.

Another type of cartridge engaging assembly which is adapted to access more than one plane of cartridge locations is shown and described in U.S. Pat. No. 6,025,972 entitled MULTI-PLANE TRANSLATING CARTRIDGE HANDLING ASSEMBLY, which is hereby specifically incorporated for all that is contained therein. This assembly is provided with a track which is located along two or three planes of cartridge locations. The assembly includes a pinion gear which engages the track and allows the assembly to be translated along the multi-plane track. A disadvantage of this assembly is that, in order to access two cartridge locations located opposite one another in parallel planes, the assembly must be translated half-way around the track. It would be much more advantageous to provide a cartridge engaging assembly which is able to simply rotate to access an opposing cartridge location.

Thus, a need exists for a cartridge engaging assembly which is adapted to rotate in order to access cartridge locations in more than one plane. Such a system should be simply constructed, with a minimal number of components.

SUMMARY OF THE INVENTION

The present invention is directed to a cartridge engaging assembly for translating a cartridge. The cartridge engaging assembly may include a linearly translatable cartridge engaging device adapted to engage a cartridge, and a first drive assembly operably connected to the cartridge engaging device which is adapted to linearly translate the cartridge engaging device in a lateral direction. The first drive assembly may comprise a first motor operably connected to a first drive train. A second drive assembly is operably connected to the cartridge engaging device and is adapted to linearly translate the cartridge engaging device in a longitudinal direction. The second drive assembly may comprise a second motor operably connected to a second drive train. A third drive assembly is operably connected to the cartridge engaging device and is adapted to rotate the cartridge engaging device around an axis.

In one embodiment, the third drive assembly may comprise the second motor operably connected to a third drive train. In this embodiment, the cartridge engaging assembly may further comprise a rotatable and linearly translatable flip latch assembly. The third drive train may comprise a gear with a plurality of slots therein, and the flip latch assembly may comprise a tab which is engageable with one of the slots in order to rotate the flip latch assembly around the axis.

In this embodiment, the cartridge engaging device may further comprise an extending portion which is engageable with an extending portion on the flip latch assembly in order to translate the flip latch assembly in a rearward lateral direction. The flip latch assembly may further comprise a biasing device which urges the flip latch assembly in a forward lateral direction.

In another embodiment of the cartridge engaging assembly, the second drive assembly and the third drive assembly use separate motors, and the cartridge engaging assembly does not include a flip latch assembly for the cartridge engaging device. In this embodiment, the third drive assembly comprises a third motor operably connected to a third drive train.

The cartridge engaging assembly of either embodiment may further include a linearly translatable, nonrotatable outer housing and a linearly translatable and rotatable inner housing rotatably attached to the outer housing. The cartridge engaging device and flip latch assembly may be slidably attached to the inner housing. A tracking device such as a bar code reader may be positioned on the inner housing. Alternatively, a first tracking device may be positioned on the outer housing and a second tracking device may be positioned on the outer housing laterally opposite of the first tracking device.

The present invention is also directed to a cartridge handing system utilizing the cartridge engaging assembly of either embodiment described herein. The cartridge handling system may further include a plurality of cartridge locations oriented along a first plane and a second plane. The cartridge engaging assembly is adapted to translate a cartridge from one of the cartridge locations to another cartridge location oriented along either plane.

The present invention is also directed to a method for rotating a cartridge engaging device of the cartridge engaging assembly described above. The first step of the method involves aligning one of the slots on the gear with the tab on the flip latch assembly. The next step involves using the first drive assembly to linearly translate the cartridge engaging device in a rearward lateral direction. The next step involves engaging the flip latch assembly with the cartridge engaging device. The next step involves using the first drive assembly and the cartridge engaging device to translate the flip latch assembly in a rearward lateral direction in order to engage the slot with the tab. The next step involves using the third drive assembly to rotate the gear 180 degrees. The final step involves linearly translating the cartridge engaging assembly in a forward lateral direction in order to disengage the cartridge engaging device from the flip latch assembly and disengage the tab from the slot.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
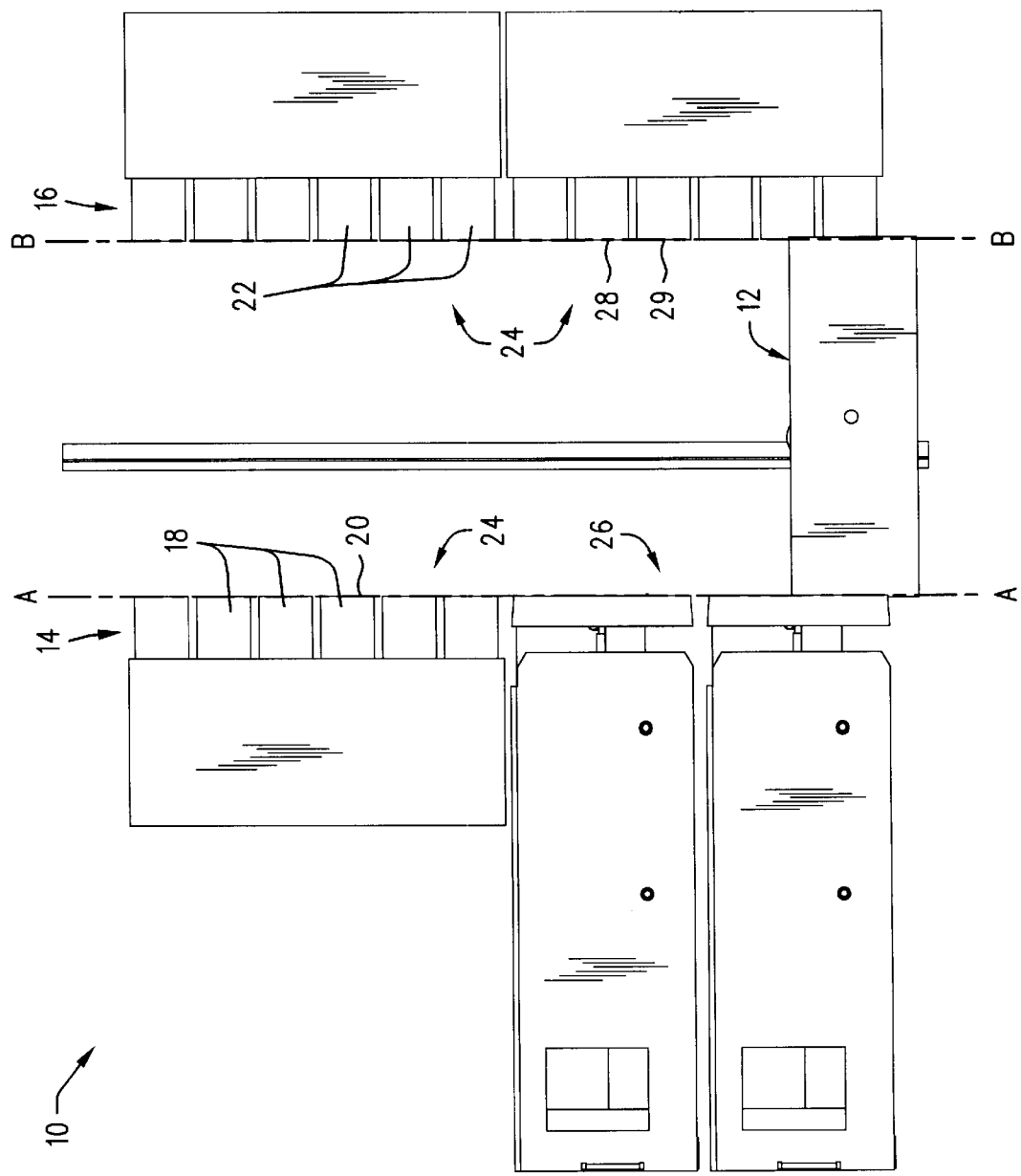
FIG. 1 is a top view of a cartridge handling system utilizing the rotatable cartridge engaging assembly of the present invention.

FIG. 1 is a top view of a cartridge handling system 10 utilizing the cartridge engaging assembly 12 of the present invention. It is to be understood that the cartridge engaging assembly 12 may be utilized within any multi-plane cartridge handling system, and is not limited to the one shown in FIG. 1. The cartridge handling system 10 may comprise a first array of cartridge locations 14 oriented along a first plane AA and a second array of cartridge locations 16 oriented along a second plane BB, which is parallel to the first plane AA. The cartridge locations (e.g., 14) may be comprised of any desired arrangement of cartridge storage slots 24 and read/write drives 26. Each of the cartridges (e.g., 18) within an array of cartridge locations (e.g., 14) are oriented such that the front (e.g., 20) of the cartridge is facing outwardly toward the cartridges (e.g., 22) in the opposite array (e.g., 16). The cartridge engaging assembly 12 is adapted to rotate in order to access the cartridges and read/write drives located along either plane AA, BB, as described in further detail below.

Figure 2:
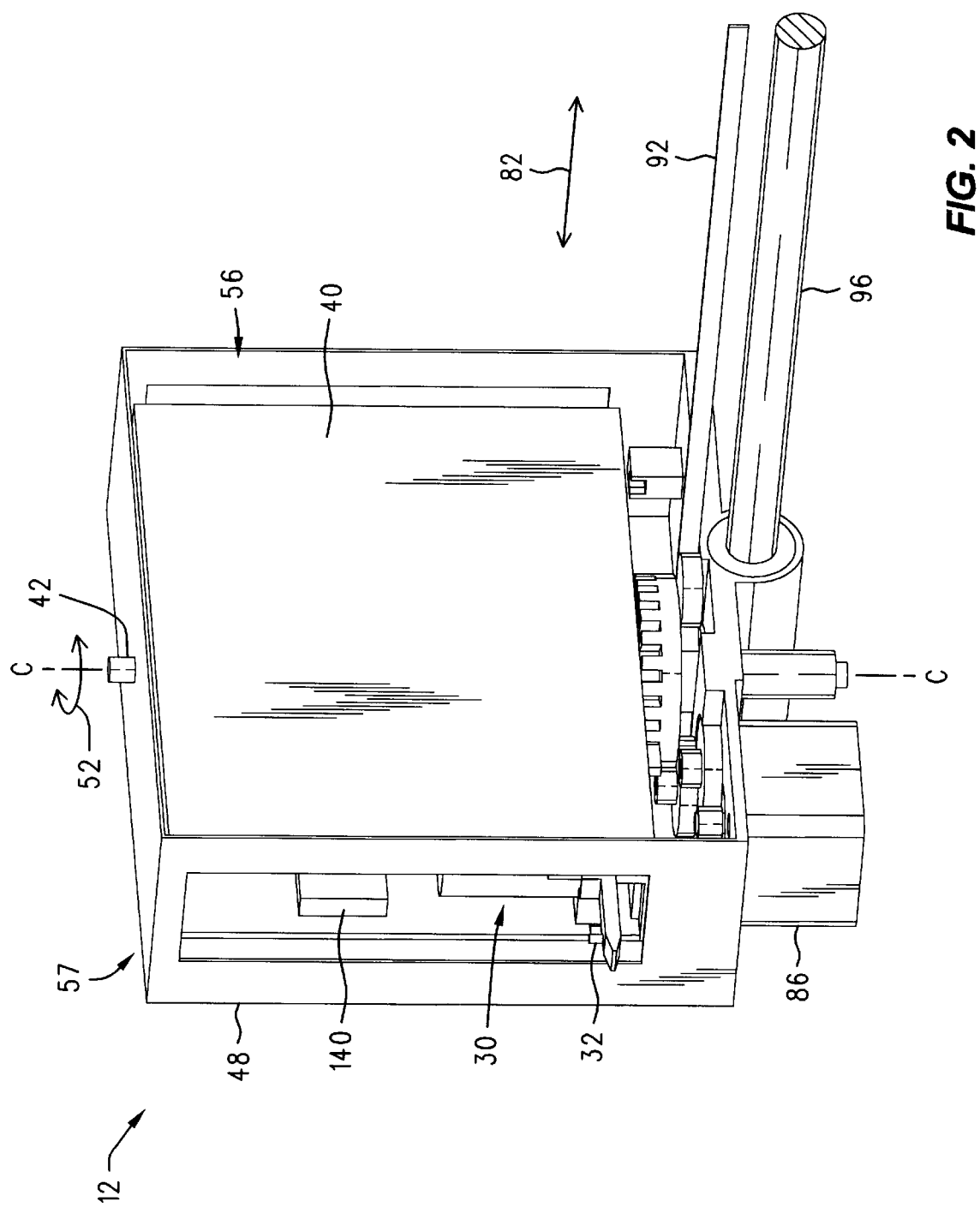
FIG. 2 is an isometric view of one embodiment of the cartridge engaging assembly of the present invention.
Figure 3:
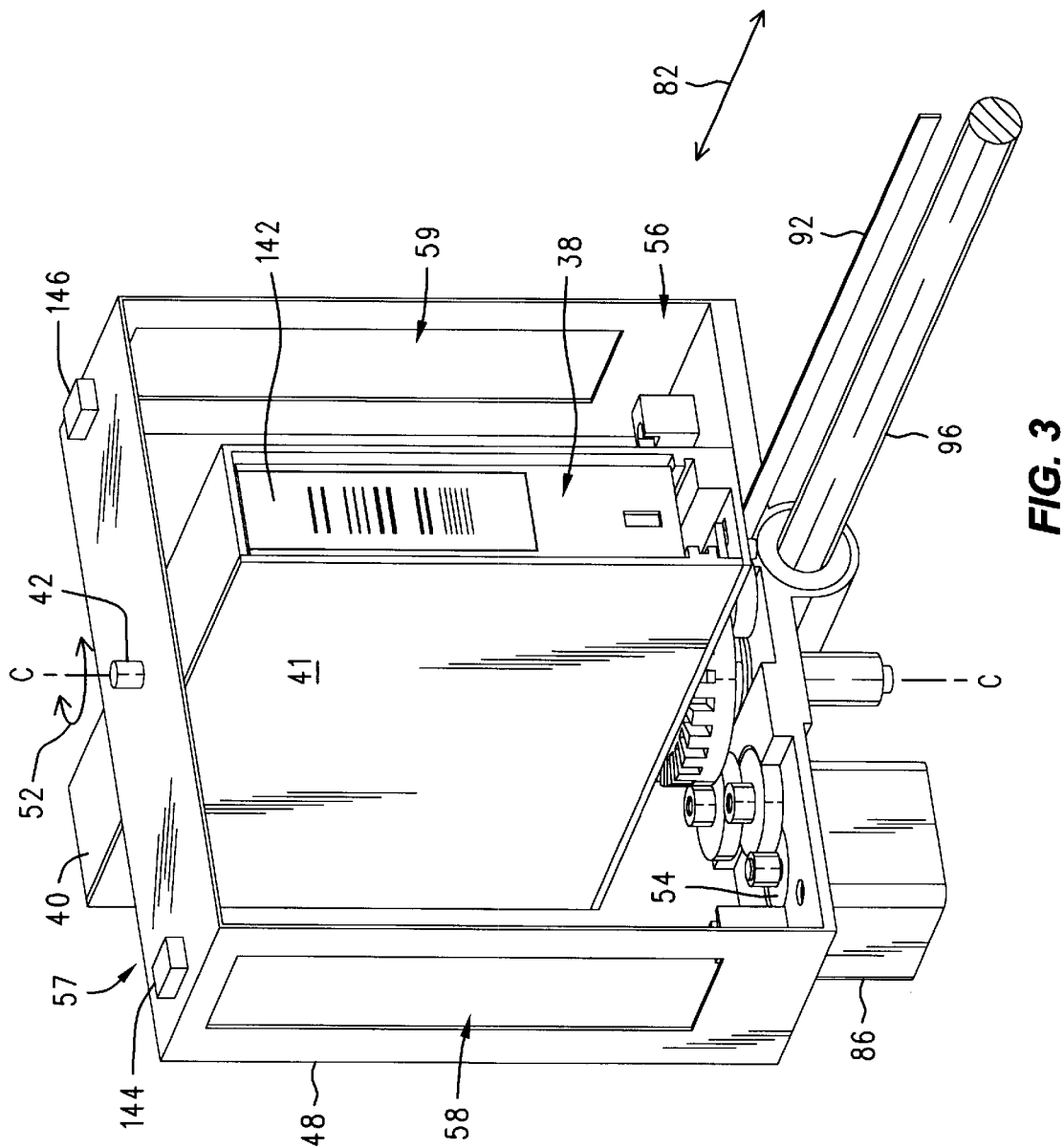
FIG. 3 is an isometric view of the cartridge engaging assembly of FIG. 2 during rotation thereof.

FIGS. 2–6 illustrate one embodiment of the cartridge engaging assembly 12 of the present invention. The cartridge engaging assembly 12 may comprise a cartridge engaging device 30 which may be any device adapted to engage a cartridge 38 (FIG. 3), including but not limited to the device shown in FIGS. 2–6. The cartridge engaging device 30 may be of the type described in U.S. Pat. Nos. 6,160,786 and 6,157,513, which were incorporated by reference above. As shown in FIG. 2, the cartridge engaging device 30 may comprise at least one latch 32 which is adapted to engage one or more notches (not shown) in a cartridge 38 (FIG. 3). It is to be understood that the present invention may alternatively accommodate a cartridge engaging device with two latches (not shown) which are adapted to engage notches (not shown) on the top and bottom (or sides) of a cartridge, such as the cartridge engaging device shown in U.S. Pat. No. 5,010,536, which was incorporated by reference above.

As shown in FIGS. 2 and 3, the cartridge engaging assembly 12 may further comprise a rotatable inner housing 40 which houses the cartridge engaging device 30, and a linearly translatable outer housing 48. The inner housing 40 may be rotatably attached to the outer housing 48 with a peg 42, pin, or the like (FIGS. 2, 3 and 6) at the top thereof which may be attached to or integrally formed with the inner housing 40. The peg 42 may extend through an opening 50

(FIG. 4) in the outer housing 48. The inner housing 40 is rotatable around axis CC in direction 52 (FIGS. 2 and 3). During rotation, the cartridge engaging device 30 may be engaged with a cartridge 38 as shown in FIG. 3, but the cartridge engaging device 30 may also be rotated without a cartridge. The outer housing 48 is fixed relative to the inner housing 40, i.e., the outer housing 48 does not rotate. The outer housing 48 may be open on two sides 56, 57, thereof to allow the inner housing 40 adequate "swing" area, as shown in FIG. 3. The outer housing 48 may further comprise a first opening 58 and a second opening 59 located opposite the first opening which are sized to allow a cartridge 38 to pass therethrough.

The cartridge engaging device 30 may be linearly translatable in a lateral direction 60 (FIGS. 4 and 5) such that a cartridge 38 engaged thereby can be drawn into the inner housing 40 as shown in FIG. 3, and pushed out of the housings 40, 48 and into a cartridge location 14, 16, FIG. 1. As best shown in FIGS. 5 and 6, the cartridge engaging device 30 may comprise a first outwardly projecting portion 36 and a second outwardly projecting portion 37 which may be slidably received within grooves 46, 47 in the inner housing 40. The cartridge engaging assembly 12 may further comprise a flip latch assembly 62 (FIGS. 4–6) which may be slidably housed within the inner housing 40. The flip latch assembly 62 is also linearly translatable in a lateral direction 60 through engagement by the cartridge engaging assembly 12, as described in further detail below. As best shown in FIG. 5, the flip latch assembly 62 may further comprise a forward stop 66 and a rear stop 68 which may extend through one or more openings (not shown) in the bottom 44 of the inner housing 40 (only one sidewall 41, FIGS. 3 and 5, of the housing 40 is shown in FIG. 5). The forward stop 66 may contact the forward end of the opening(s) in order to halt the translation of the flip latch assembly 62 in the forward lateral direction 63. The approximate position of the forward end of the opening(s) is indicated by a dashed line 43 in FIG. 5. The rear stop 68 may contact the rear end of the opening(s) in order to halt the translation of the flip latch assembly 62 in the rearward lateral direction 61. The approximate position of the rear end of the opening(s) is indicated by a dashed line 45 in FIG. 5. In this manner, the forward and rear stops 66, 68 and the forward and rear ends of the opening(s) in the bottom 44 of the inner housing 40 define the lateral distance the flip latch assembly 62 may travel in direction 60.

Figure 4:
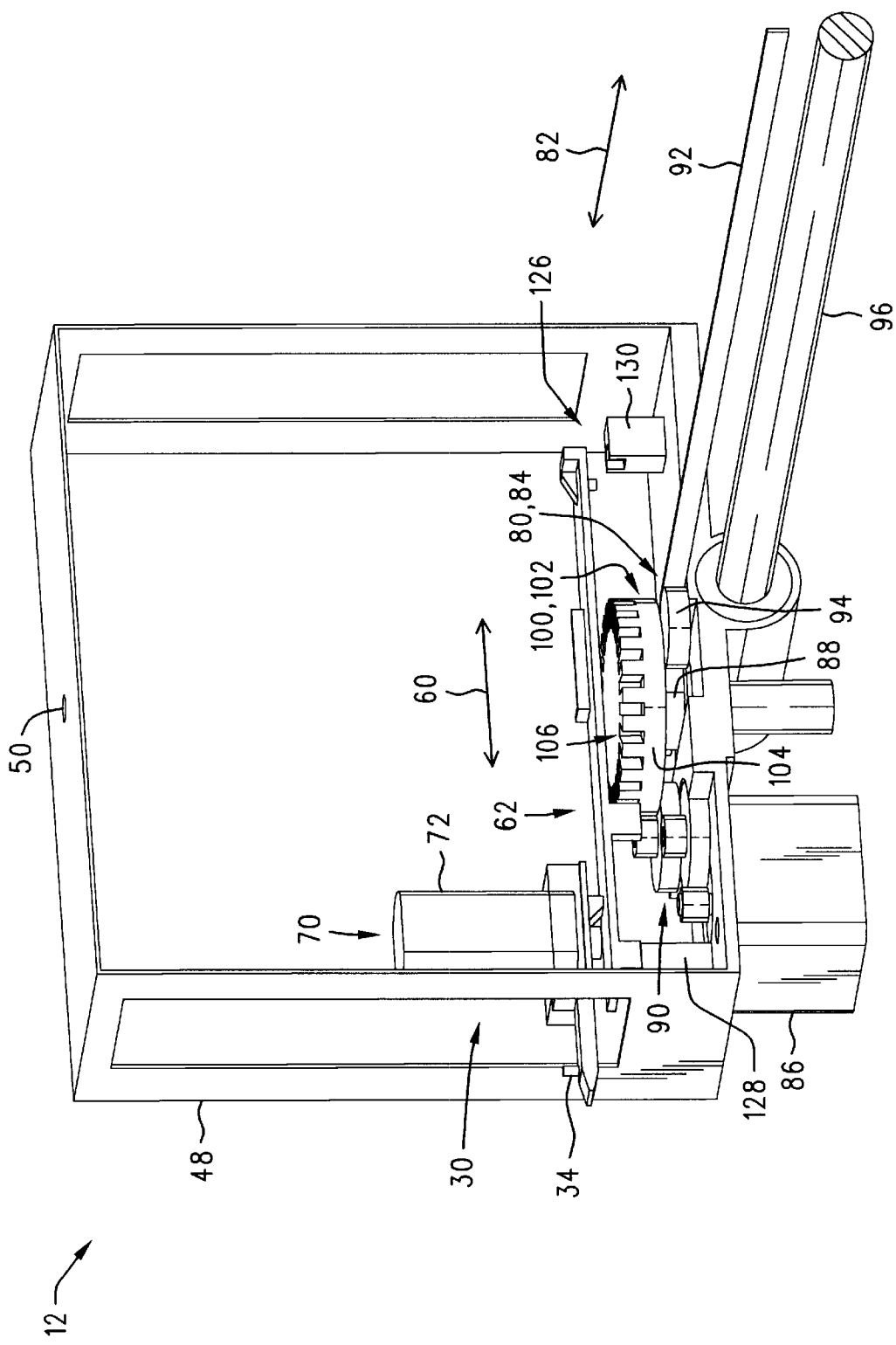
FIG. 4 is an isometric view of the cartridge engaging assembly of FIG. 2 with the inner housing removed for clarity.
Figure 5:
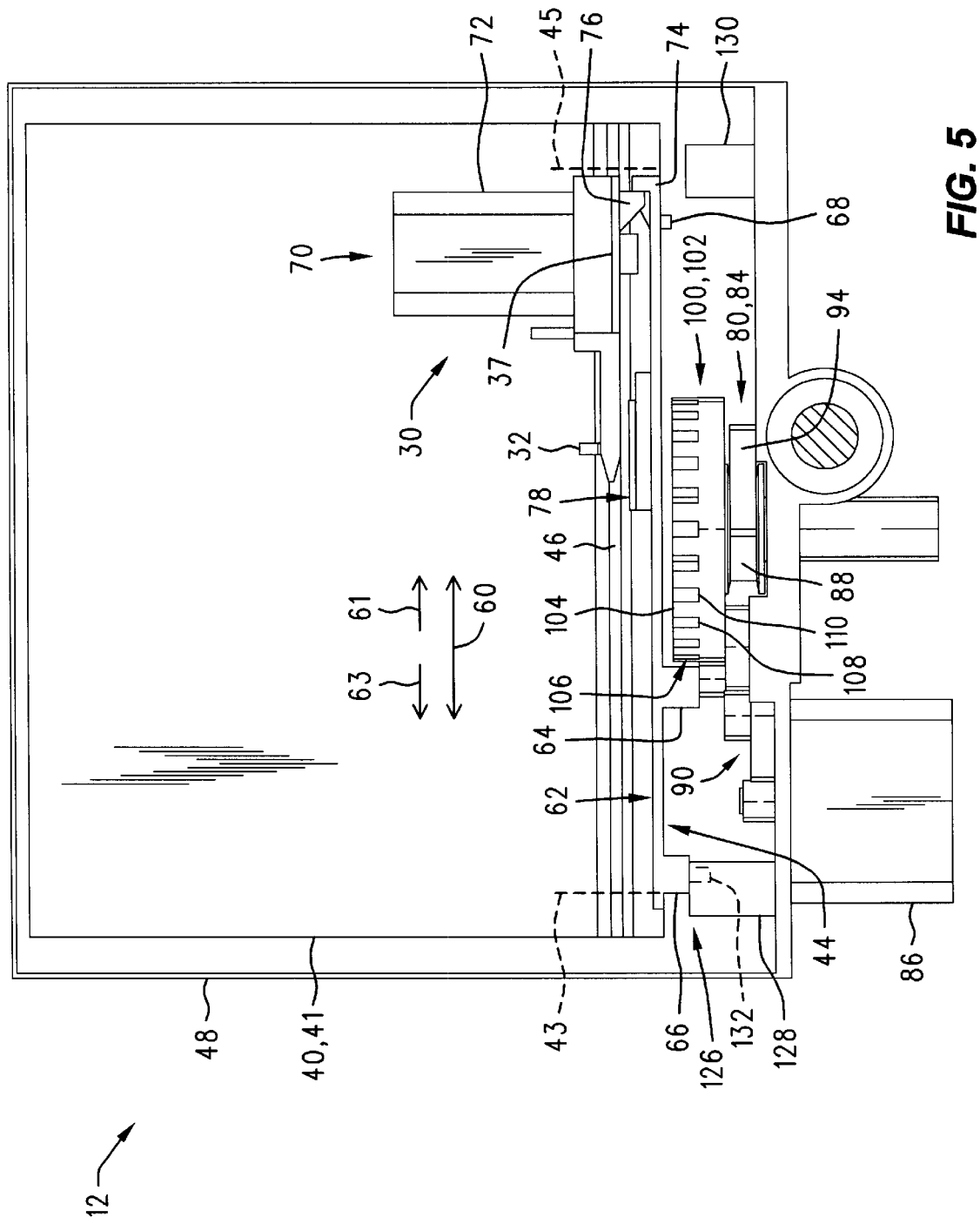
FIG. 5 is a side view of the cartridge engaging assembly of FIG. 2.
Figure 6:
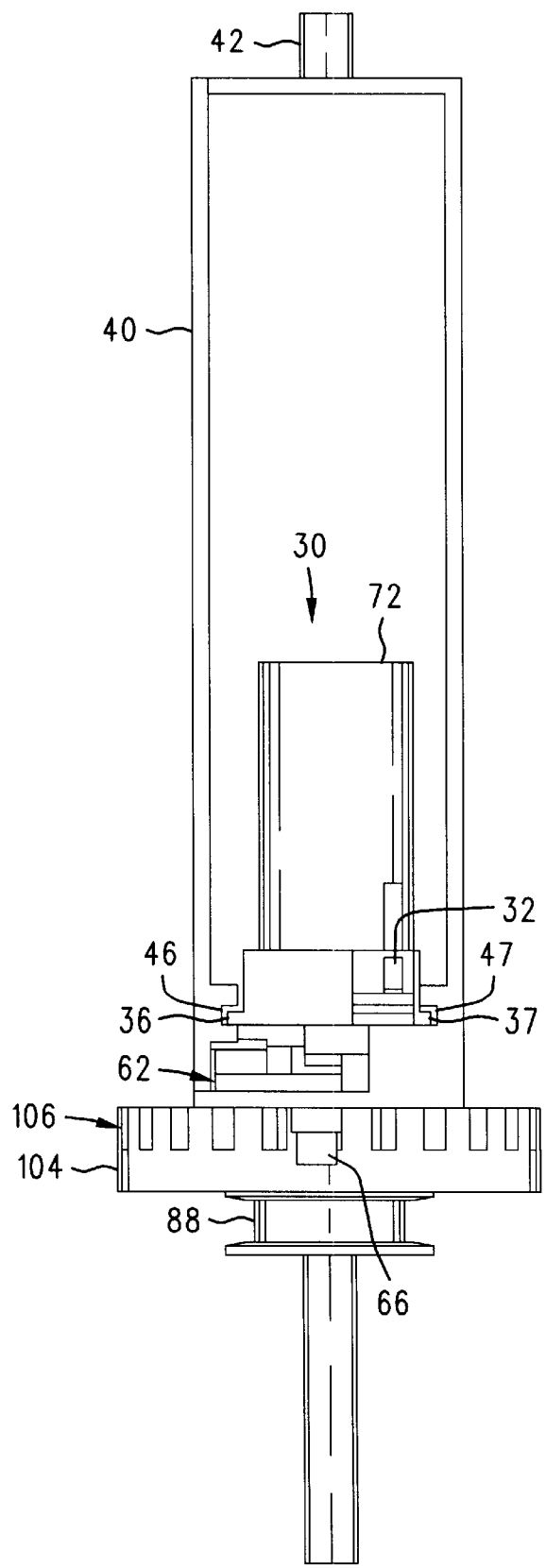
FIG. 6 is a front view of the cartridge engaging assembly of FIG. 2 with the outer housing removed for clarity.

The cartridge engaging device 30 may be operably connected to a first drive assembly 70, FIGS. 4–5, which may be any type of drive assembly which is adapted to linearly translate the cartridge engaging device 30 in a lateral direction 60. The first drive assembly 70 preferably comprises a first motor 72 and a first drive train (not shown), which may be any configuration of gears, etc., known in the art as necessary to convert motor 72 operation to linear translation of the cartridge engaging device 30. The first drive assembly 70 allows the cartridge engaging device 30 to carry a cartridge (e.g., 38, FIG. 3) into and out of the inner and outer housings 40, 48.

As best shown in FIG. 5, the flip latch assembly 62 may comprise an extending portion 74 which may be engaged by an extending portion 76 on the cartridge engaging device 30 in order to translate the flip latch assembly 62 in a rearward lateral direction 61. In operation, the first drive assembly 70 may enter into an "overdrive" mode, i.e., the assembly 70 translates the cartridge engaging device 30 farther in a rearward lateral direction 61 than what is necessary to bring a cartridge 38 into the housings 40, 48 in order to engage the flip latch assembly extending portion 74 and translate the flip latch assembly 62 in a rearward lateral direction 61. The flip latch assembly 62 may further comprise a biasing device 78 (FIGS. 4 and 5) which urges the flip latch assembly 62 in a forward lateral direction 63. After the flip latch assembly 62 is rotated as described in further detail below, the first drive assembly 70 translates the cartridge engaging device 30 in a forward lateral direction 63 in order to disengage the cartridge engaging device extending portion 76 from the flip latch assembly extending portion 74. The biasing device 78 continues to urge the flip latch assembly 62 in a forward lateral direction 63 until the flip latch assembly 62 is in its forwardmost position as shown in FIG. 4.

The cartridge engaging assembly 12 may also comprise a second drive assembly 80, FIGS. 4 and 5, operably connected to the cartridge engaging device 30 which is adapted to linearly translate the cartridge engaging device 30 in a longitudinal direction 82. Specifically, the cartridge engaging device 30 is slidably housed within the inner housing 40, which is rotatably attached to the outer housing 48, which is linearly translated by the second drive assembly 80. The second drive assembly 80 may be any drive assembly known in the art which is adapted to linearly translate an assembly, device or component. For example, the second drive assembly 80 may be comprised of belts and pulleys as shown in FIGS. 2–4 and described below, or pulleys and chains or ropes (not shown), or racks and gears (not shown).

As best shown in FIGS. 4–6, the second drive assembly 80 may comprise a second motor 86 operably connected to a second drive train 84. The second drive train 84 may comprise a drive pulley 88 which may be attached to or integrally formed with a gear 104 from the third drive assembly 100 described below. The second drive train 84 may further comprise one or more intermediate gears 90 (which may be toothed gears) connecting the gear 104 (which may also be a toothed gear) with the motor 86 as necessary to coordinate the motor speed with the desired rotational speed of the gear 104. It should be noted that the drive pulley 88 may be located anywhere along the second drive train 84. The second drive train 84 may further comprise a belt (which may be a toothed belt) 92, rope or chain and one or more idler pulleys 94 (only one shown) as necessary in order for the belt, rope or chain to maintain drivable contact with the drive pulley 88. A support and guide rail 96 may also be included which the outer housing 48 may slidably engage as shown in FIGS. 2–4.

The cartridge engaging assembly 12 may also comprise a third drive assembly 100 (FIGS. 4 and 5) operably connected to the cartridge engaging device 30 which is adapted to rotate the cartridge engaging device 30 around axis CC in direction 52 (FIGS. 2 and 3). Specifically, the cartridge engaging device 30 is slidably housed within the inner housing 40, and the inner housing 40 is rotatably translated by the third drive assembly 100. In the embodiment shown in FIGS. 2–6, the third drive assembly 100 may comprise a third drive train 102 operably connected to the second motor 86. As best shown in FIGS. 4 and 5, the third drive train 102 may comprise a gear 104 with a plurality of slots 106 therein. The flip latch assembly 62 may comprise a tab 64 (FIG. 5) which is engageable with each slot 106 in the gear 104, whereby the tab 64 engages a slot 106 in order to rotate the flip latch assembly 62 around axis CC. The third drive train 102 may further comprise one or more intermediate gears 90 connecting the gear 104 with the second motor 86 as described above with reference to the second drive train 84. The second motor 86 may be positioned outside the outer housing 48, and the intermediate gears 90 may be housed within the outer housing 48 and extend through an opening 54 in the outer housing 48 as best shown in FIG. 3.

In operation, the cartridge engaging device 30 is aligned with a cartridge location 14, 16, FIG. 1, in order to retrieve a cartridge 18, 22, FIG. 1 from a storage slot 24 or read/write drive 26, or put a cartridge 18, 22 into a storage slot 24 or read/write drive 26. A slot 106 on the gear 104 (FIGS. 4–6) is then aligned with the tab 64 (FIG. 5) on the flip latch assembly 62 (or a slot 106 may already be in alignment with the tab 64). In the embodiment shown in FIGS. 2–6 whereby both the second drive train 84 and the third drive train 102 are connected to the same motor (second motor 86), linear translation in a longitudinal direction 82 also rotates the gear 104. Thus, the slots 106 may be spaced apart such that, with rotation of the gear 104 from a first slot (e.g., 108, FIG. 5) to a second, adjacent slot (e.g., 110, FIG. 5), the flip latch assembly 62 and cartridge engaging device 30 are linearly moved from alignment with one cartridge location (e.g., 28, FIG. 1) to alignment with an adjacent cartridge location (e.g., 29, FIG. 1).

Figure 7:
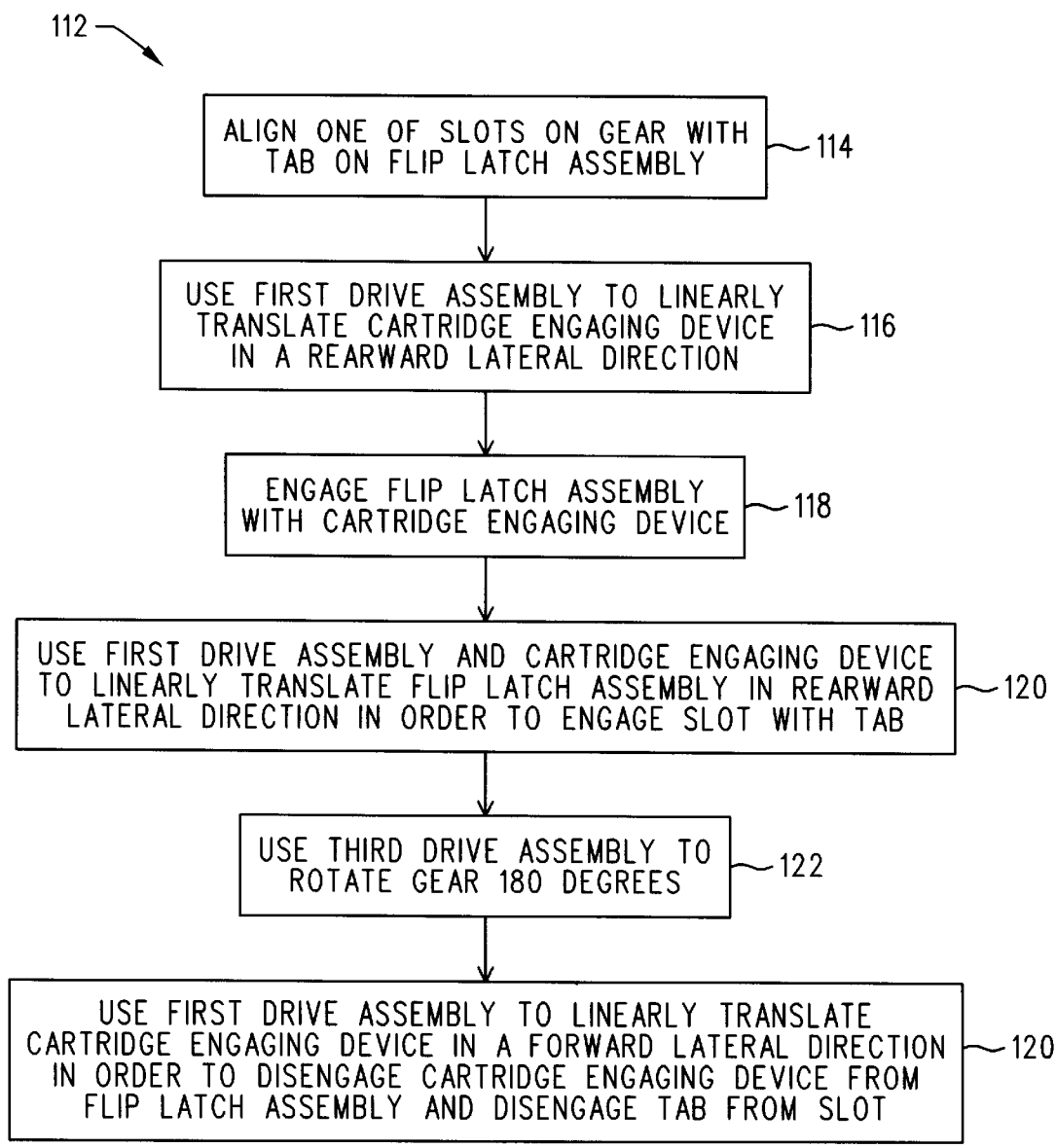
FIG. 7 is a flow chart illustrating a method for rotating a cartridge engaging device of the cartridge engaging assembly of FIGS. 2–6.

FIG. 7 illustrates a method 112 for rotating the cartridge engaging device 30 of the cartridge engaging assembly 12 described above. This method describes the rotational operating mode of the cartridge engaging assembly 12. The cartridge engaging assembly 12 may enter into the rotational operating mode with or without a cartridge (e.g., 38, FIG. 3) engaged thereby.

With reference also to FIGS. 2–6, the first step 114 of the method 112 comprises aligning one of the slots 106 on the gear 104 with the tab 64 on the flip latch assembly 62. The next step 116 comprises using the first drive assembly 70 to linearly translate the cartridge engaging device in a rearward lateral direction 61 (FIG. 5). The next step 118 comprises engaging the flip latch assembly 62 with the cartridge engaging device 30. More particularly, the extending portion 76 on the cartridge engaging device 30 engages the extending portion 74 on the flip latch assembly 62. The next step 120 comprises using the first drive assembly 70 and the cartridge engaging device 30 to linearly translate the flip latch assembly 62 in a rearward lateral direction 61 in order to engage the slot 106 on the gear 104 with the tab 64 on the flip latch assembly 62. Specifically, the extending portion 76 on the cartridge engaging device 30 pushes on the extending portion 74 on the flip latch assembly 62, which moves the flip latch assembly 62 in a rearward lateral direction 61. The next step 122 comprises using the third drive assembly 100 to rotate the gear 104 180 degrees. The final step 124 comprises using the first drive assembly 70 to linearly translate the cartridge engaging device 30 in a forward lateral direction 63 in order to disengage the cartridge engaging device 30 from the flip latch assembly 62 and disengage the tab 104 from the slot 106.

The cartridge engaging assembly 12 may further comprise a latch-unlock mechanism 126 which prevents the flip latch assembly 62 from rotating when the cartridge engaging assembly 12 is not in a rotational operating mode. As best shown in FIGS. 4 and 5, the latch-unlock mechanism 126 may comprise a first catch 128 and a second catch 130 which are each adapted to receive a pin 132 on the flip latch assembly 62 (which may be attached to or integrally formed with the forward stop 66 as shown in FIG. 5). The catches 128, 130 are preferably attached to or integrally formed with the outer housing 40 as shown. As the flip latch assembly 62 is linearly translated in a rearward lateral direction 61 during the rotational operating mode as described above, the pin 132 is released from a catch (e.g., 128, FIG. 5), and the flip latch assembly 62 is allowed to rotate. As described above, upon completion of a rotation, the flip latch assembly 62 is translated in a forward lateral direction 63, and the pin 132 is received into the opposite catch (e.g.,130, FIG. 5). Alternately (not shown), the catches may be adapted to receive the flip latch assembly 62 immediately after rotation thereof and release the flip latch assembly 62 immediately prior to rotation thereof. For example, the catches may be provided with a release mechanism (not shown) which is activated by the linear translation of the flip latch assembly 62 in a rearward lateral direction 61.

The cartridge handling system 10 of any of the embodiments described herein may include a tracking device such as a bar code reader. Such a tracking device is described in U.S. patent application Ser. No. 09/292,781, now abandoned, which was incorporated by reference above. However, it is to be understood that any tracking device may be utilized with the present invention. As shown in FIG. 2, a tracking device 140 may be positioned on a rotatable portion of the cartridge engaging assembly 12, e.g., on the inner housing 40. The tracking device 140 may be adapted to read labels such as a bar code label 142 shown on the cartridge 38 in FIG. 3.

Alternatively, as shown in FIG. 3, two tracking devices 144, 146 may be provided which are positioned on a non-rotating portion of the assembly 12, i.e., on the outer housing 48. Each of the tracking devices 144, 146 would face one plane of cartridges (e.g., tracking device 144 could face cartridges aligned along plane AA, FIG. 1, and tracking device 146 could faces cartridges aligned along plane BB, FIG. 1). While providing two tracking devices would increase the overall cost of the system 10, it would also increase the speed in which cartridges could be scanned. In other words, both of the tracking devices 144, 146 could be operating simultaneously on both planes (AA, BB, FIG. 1) of cartridges, or operation may be switched between the tracking devices 144, 146 as desired, allowing both planes (AA, BB, FIG. 1) of cartridges to be read without having to rotate the cartridge engaging device 30 and inner housing 40. Even with two tracking devices, the present invention is superior to a pass-through assembly with two tracking devices since a cartridge (e.g., 38, FIG. 1) in the present invention needs a label only on the front thereof as shown in FIG. 3, as opposed to the prior art pass-through assembly which requires a label on both the front and rear of each cartridge as described above.

Figure 8:
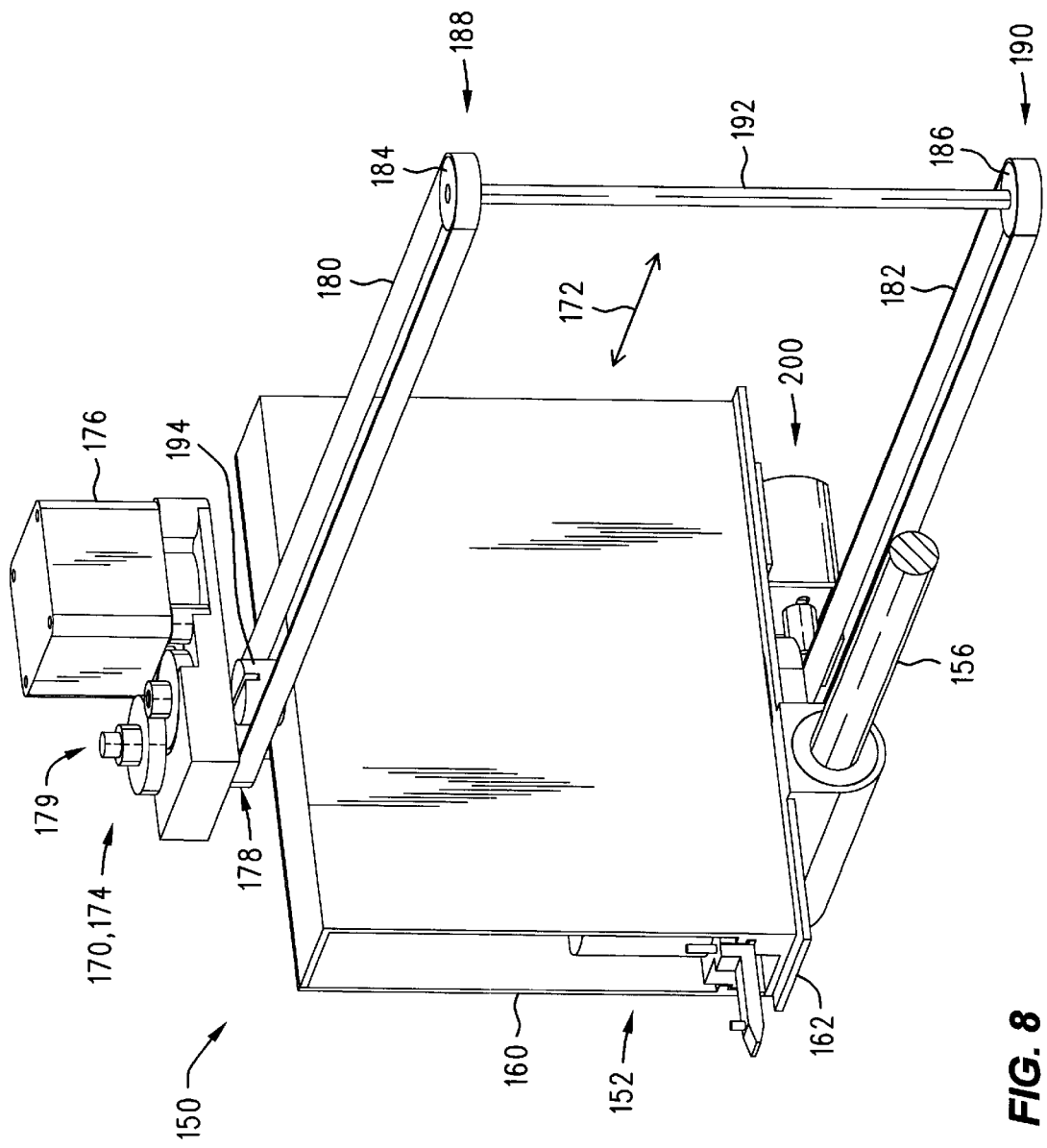
FIG. 8 is an isometric view of another embodiment of the cartridge engaging assembly of the present invention, with components removed for clarity.
Figure 9:
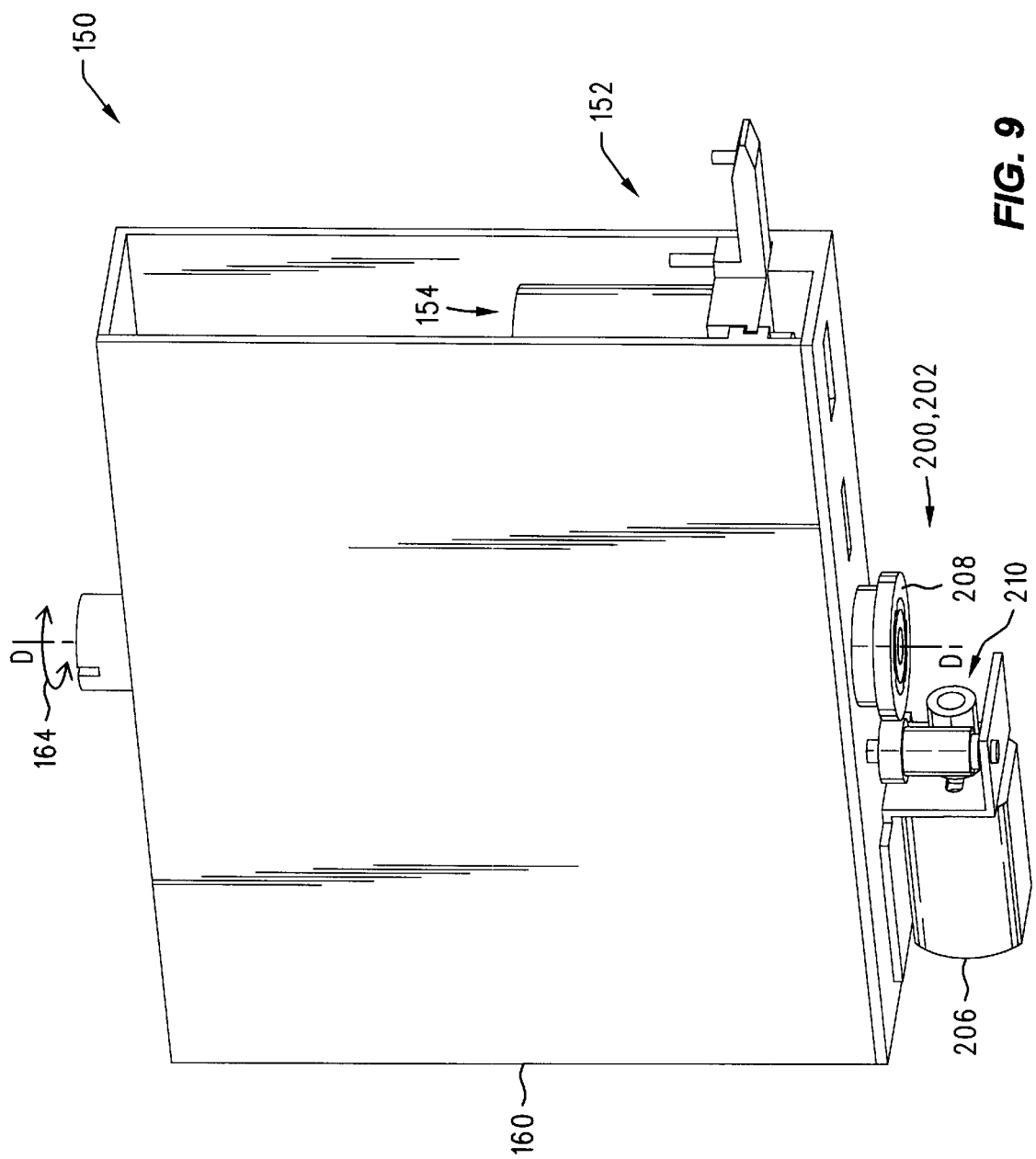
FIG. 9 is an isometric view of the cartridge engaging assembly of FIG. 8, with no components removed.

FIGS. 8 and 9 illustrate another embodiment of the cartridge engaging assembly 150 of the present invention which may be utilized in a cartridge handling system 10, FIG. 1. The cartridge engaging assembly 150 may be substantially identical to the cartridge engaging assembly 12 described above, except where otherwise noted. As shown in FIGS. 8 and 9, the cartridge engaging assembly 150 may comprise a cartridge engaging device 152 which may be identical to the cartridge engaging device 30 described above. The cartridge engaging assembly 150 may further comprise a first drive assembly 154 (FIG. 9) which may be identical to the first drive assembly 70 described above. In this embodiment, a flip latch assembly is not needed. A support and guide rail 156 (removed from FIG. 9 for clarity) may also be provided which may be identical to the support and guide rail 96 shown in FIGS. 2–4.

The cartridge engaging assembly 150 may further comprise a rotatable inner housing 160 which houses the cartridge engaging device 152, and a linearly translatable outer housing 162 (removed from FIG. 9 for clarity). As shown in FIG. 8, the outer housing 162 may comprise only the bottom portion of the outer housing 48 shown in FIGS. 2–5, without any sidewalls or top wall, or, alternatively, the outer housing 162 may be substantially identical to the housing 48 shown in FIGS. 2–5. The inner housing 160 may be rotatably attached to the outer housing 162. The inner housing 160 is rotatable around axis DD in direction 164. The outer housing 162 is fixed relative to the inner housing 160, i.e., the outer housing 162 does not rotate.

The cartridge engaging assembly 150 may further comprise a second drive assembly 170 and a third drive assembly 200, each of which are operably connected to the cartridge engaging device 30. Unlike the second and third drive assemblies 80, 100 of FIGS. 2–6, the second and third drive assemblies 170, 200 of FIGS. 8 and 9 are completely separate from one another and comprise separate motors 176, 206.

The second drive assembly 170 (removed from FIG. 9 for clarity) in this embodiment is adapted to linearly translate the cartridge engaging device 152 in a longitudinal direction 172. Specifically, the cartridge engaging device 152 is slidably housed within the inner housing 160, which is rotatably attached to the outer housing 162, which is linearly translated by the second drive assembly 170. It should be noted that, like the second drive assembly 80 of FIGS. 2–6, the second drive assembly 170 of FIGS. 8 and 9 need not comprise the assembly shown in these figures. Instead, the second drive assembly 170 may be any linear drive assembly known in the art that uses a motor which is not operably connected to the third drive assembly 200. For example, the second drive assembly 170 may be comprised of belts and pulleys as shown in FIG. 8, or pulleys and chains or ropes (not shown), or racks and gears (not shown).

As shown in FIG. 8, the second drive assembly 170 may comprise a second motor 176 operably connected to a second drive train 174. The second drive train 174 may comprise a drive pulley 178 which, unlike the embodiment shown in FIGS. 2–6, is not attached to any gear or drive component from the third drive assembly 200 described below. The second drive train 174 may further comprise one or more intermediate gears 179 (which may be toothed gears) connecting the drive pulley 178 with the second motor 176 as necessary to coordinate the motor speed with the desired rotational speed of the drive pulley 178.

The second drive train 174 may further comprise one or more belts (which may be toothed belts) 180, 182, ropes or chains and one or more idler pulleys 184, 186. As shown in FIG. 8, the belts 180, 182 and idler pulleys 184, 186 may be provided at the upper end 188 and lower end 190 of the cartridge engaging assembly 150 to help stabilize the assembly 150 during linear translation thereof. The idler pulleys 184, 186 may be connected by a rotatable shaft 192. The drive pulley 178 may also be connected via a shaft (not shown) to an idler pulley (not shown) at the lower end 190 of the cartridge engaging assembly 150. The belts 180, 182 may be fixedly attached to upper and lower guide bearings 194 (only the upper guide bearing is shown) extending from the inner housing 160. The upper and lower guide bearings 192 are preferably connected to the outer housing 162 via a shaft (not shown) or the like, and are non-rotatable.

In the embodiment of FIGS. 8–9, the second drive train 174 and second motor 176 are not linearly translated with the cartridge engaging device 152 and housings 160, 162. Instead, these components are fixedly attached to a non-translatable portion of the cartridge handling system 10 such as a system housing (not shown).

The third drive assembly 200 in this embodiment is adapted to rotate the cartridge engaging device 152 around axis DD in direction 164 (FIG. 9). Specifically, the cartridge engaging device 152 is slidably housed within the inner housing 160, and the inner housing 160 is rotatably translated by the third drive assembly 200. As best shown in FIG. 9, the third drive assembly 200 may comprise a third drive train 204 operably connected to a third motor 206. The third drive train may be comprised of a gear 208 which is fixedly attached to the inner housing 160 and which may extend through an opening (not shown) in the outer housing 162 (FIG. 8). The third drive train 204 may further comprise one or more intermediate gears 210 (which may be toothed gears) connecting the gear 208 (which may also be a toothed gear) with the third motor 206 as necessary to coordinate the motor speed with the desired rotational speed of the gear 208.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

We claim:

1. A cartridge engaging assembly for translating a cartridge, comprising:
   a) a linearly translatable cartridge engaging device adapted to engage said cartridge;
   b) a first drive assembly operably connected to said cartridge engaging device which is adapted to linearly translate said cartridge engaging device in a lateral direction, wherein said first drive assembly comprises a first motor operably connected to a first drive train;
   c) a second drive assembly operably connected to said cartridge engaging device which is adapted to linearly translate said cartridge engaging device in a longitudinal direction, wherein said second drive assembly comprises a second motor operably connected to a second drive train;
   d) a third drive assembly operably connected to said cartridge engaging device which is adapted to rotate said cartridge engaging device around an axis, wherein said third drive assembly comprises said second motor operably connected to a third drive train;
   e) a rotatable and linearly translatable flip latch assembly;
   f) wherein said cartridge engaging device comprises an extending portion;
   g) wherein said flip latch assembly comprises an extending portion and a biasing device which urges said flip latch assembly in a forward lateral direction; and
   h) wherein said extending portion on said cartridge engaging device engages said extending portion on said flip latch assembly in order to translate said flip latch assembly in a rearward lateral direction.

2. The cartridge engaging assembly of claim 1, further comprising a linearly translatable, nonrotatable outer housing and a linearly translatable and rotatable inner housing rotatably attached to said outer housing.

3. The cartridge engaging assembly of claim 2, further comprising a tracking device positioned on said inner housing.

4. The cartridge engaging assembly of claim 2, further comprising a first tracking device positioned on said outer housing and a second tracking device positioned on said outer housing laterally opposite of said first tracking device.

5. The cartridge engaging assembly of claim 1, wherein:
   a) said third drive train comprises a gear with a plurality of slots therein;

b) said flip latch assembly comprises a tab which is engageable with each of said slots; and c) said tab engages one of said slots in order to rotate said flip latch assembly around said axis.

6. A cartridge handling system, comprising:

a) a plurality of cartridge locations oriented along a first plane;

b) a plurality of cartridge locations oriented along a second plane; and c) a cartridge engaging assembly for translating a cartridge from one of said cartridge locations oriented along either said first plane or said second plane to another of said cartridge locations oriented along either said first plane or said second plane, comprising:

i) a linearly translatable cartridge engaging device adapted to engage said cartridge;

ii) a first drive assembly operably connected to said cartridge engaging device which is adapted to linearly translate said cartridge engaging device in a lateral direction, wherein said first drive assembly comprises a first motor operably connected to a first drive train;

iii) a second drive assembly operably connected to said cartridge engaging device which is adapted to linearly translate said cartridge engaging device in a longitudinal direction, wherein said second drive assembly comprises a second motor operably connected to a second drive train;

iv) a third drive assembly operably connected to said cartridge engaging device which is adapted to rotate said cartridge engaging device around an axis, wherein said third drive assembly comprises said second motor operably connected to a third drive train;

v) a rotatable and linearly translatable flip latch assembly;

vi) wherein said cartridge engaging device comprises an extending portion;

vii) wherein said flip latch assembly comprises an extending portion and a biasing device which urges said flip latch assembly in a forward lateral direction; and viii) wherein said extending portion on said cartridge engaging device engages said extending portion on said flip latch assembly in order to translate said flip latch assembly in a rearward lateral direction.

7. The cartridge handing system of claim 6, wherein said cartridge engaging assembly further comprises a linearly translatable, nonrotatable outer housing and a linearly translatable and rotatable inner housing rotatably attached to said outer housing.

8. The cartridge handling system of claim 7, wherein said cartridge engaging assembly further comprises a tracking device positioned on said inner housing.

9. The cartridge handling system of claim 7, wherein said cartridge engaging assembly further comprises a first tracking device positioned on said outer housing and facing said first plane of cartridge locations, and a second tracking device positioned on said outer housing laterally opposite of said first tracking device and facing said second plane of cartridge locations.

10. The cartridge handling system of claim 6, wherein:

a) said third drive train comprises a gear with a plurality of slots therein;

b) said flip latch assembly comprises a tab which is engageable with each of said slots; and c) said tab engages one of said slots in order to rotate said flip latch assembly around said axis.

11. A method for rotating a cartridge engaging device of a cartridge engaging assembly, said cartridge engaging assembly comprising a first drive assembly operably connected to said cartridge engaging device which is adapted to linearly translate said cartridge engaging device, a rotatable and linearly translatable flip latch assembly for said cartridge engaging device, a third drive assembly operably connected to said cartridge engaging device which is adapted to rotate said cartridge engaging device around an axis, wherein said third drive assembly comprises a gear with a plurality of slots therein and said flip latch assembly comprises a tab which is engageable with each of said slots, said method comprising:

a) aligning one of said slots on said gear with said tab on said flip latch assembly;

b) using said first drive assembly to linearly translate said cartridge engaging device in a rearward lateral direction;

c) engaging said flip latch assembly with said cartridge engaging device;

d) using said first drive assembly and said cartridge engaging device to linearly translate said flip latch assembly in said rearward lateral direction in order to engage said slot with said tab;

e) using said third drive assembly to rotate said gear 180 degrees; and f) using said first drive assembly to linearly translate said cartridge engaging device in a forward lateral direction in order to disengage said cartridge engaging device from said flip latch assembly and disengage said tab from said slot.

12. A cartridge engaging assembly for translating a cartridge, comprising:

a) a linearly translatable cartridge engaging device adapted to engage said cartridge;

b) a first drive assembly operably connected to said cartridge engaging device which is adapted to linearly translate said cartridge engaging device in a lateral direction;

c) a second drive assembly operably connected to said cartridge engaging device which is adapted to linearly translate said cartridge engaging device in a longitudinal direction;

d) a third drive assembly selectively engageable with said cartridge engaging device which is adapted to rotate said cartridge engaging device around an axis; and e) a flip latch assembly selectively engageable with said cartridge engaging device and said third drive assembly in order to operably connect said cartridge engaging device with said third drive assembly for rotation of said cartridge engaging device.

13. The cartridge engaging assembly of claim 12, wherein:

a) said first drive assembly comprises a first motor operably connected to a first drive train;

b) said second drive assembly comprises a second motor operably connected to a second drive train; and c) said third drive assembly comprises said second motor operably connected to a third drive train.

14. A cartridge handling system, comprising:

a) a plurality of cartridge locations oriented along a first plane;

b) a plurality of cartridge locations oriented along a second plane; and c) a cartridge engaging assembly for translating a cartridge from one of said cartridge locations oriented along either said first plane or said second plane to another of said cartridge locations oriented along either said first plane or said second plane, comprising:
  i) a linearly translatable cartridge engaging device adapted to engage said cartridge;
  ii) a first drive assembly operably connected to said cartridge engaging device which is adapted to linearly translate said cartridge engaging device in a lateral direction;
  iii) a second drive assembly operably connected to said cartridge engaging device which is adapted to linearly translate said cartridge engaging device in a longitudinal direction;
  iv) a third drive assembly engageable with and disengageable from said cartridge engaging device which is adapted to rotate said cartridge engaging device around an axis; and
  v) a flip latch assembly selectively engageable with said cartridge engaging device and said third drive assembly in order to operably connect said cartridge engaging device with said third drive assembly for rotation of said cartridge engaging device.

15. The cartridge handling system of claim 14, wherein:

a) said first drive assembly comprises a first motor operably connected to a first drive train;

b) said second drive assembly comprises a second motor operably connected to a second drive train; and c) said third drive assembly comprises said second motor operably connected to a third drive train.

* * * * *